United States Patent
Knight

(10) Patent No.: US 8,641,093 B1
(45) Date of Patent: Feb. 4, 2014

(54) RETRACTABLE LIMB GUARD

(71) Applicant: Daniel U. Knight, Sapulpa, OK (US)

(72) Inventor: Daniel U. Knight, Sapulpa, OK (US)

(*) Notice: Subject to any disclaimer, the term of this patent is extended or adjusted under 35 U.S.C. 154(b) by 0 days.

(21) Appl. No.: 13/760,747

(22) Filed: Feb. 6, 2013

(51) Int. Cl.
*B60R 21/02* (2006.01)

(52) U.S. Cl.
USPC ....... 280/748; 280/749; 296/96.2; 296/96.21; 296/96.13; 296/92; 296/190.03; 180/69.2; 180/69.24

(58) Field of Classification Search
USPC .............. 280/748, 749, 756; 180/69.2, 69.24, 180/313; 296/92, 96.13, 69.2, 69.24, 84.1, 296/190.03; 172/245, 247, 253, 508; 56/190
See application file for complete search history.

(56) References Cited

U.S. PATENT DOCUMENTS

| | | | |
|---|---|---|---|
| 2,011,057 A * | 8/1935 | Kraft | 296/96.2 |
| 2,451,553 A | 6/1946 | Hedquist | |
| 2,919,156 A | 10/1957 | Dodge | |
| 2,919,155 A * | 12/1959 | Williams et al. | 296/96.2 |
| 3,180,441 A | 4/1965 | Reaves | |
| 3,961,492 A * | 6/1976 | Buehler et al. | 405/303 |
| 4,012,807 A * | 3/1977 | Kern | 16/288 |
| 5,839,758 A * | 11/1998 | Finch et al. | 280/756 |
| 5,938,267 A * | 8/1999 | Schurig | 296/96.2 |
| 6,126,227 A * | 10/2000 | Bitelli | 296/107.03 |
| 6,442,801 B1 * | 9/2002 | Kim | 16/361 |
| 7,222,882 B2 | 5/2007 | Boucher | |
| 7,802,345 B2 * | 9/2010 | Mathew et al. | 16/370 |
| 8,191,928 B2 * | 6/2012 | Hulscher et al. | 280/748 |
| 2010/0024162 A1* | 2/2010 | Walz | 16/233 |

* cited by examiner

*Primary Examiner* — Joseph Rocca
*Assistant Examiner* — Barry Gooden, Jr.
(74) *Attorney, Agent, or Firm* — Head, Johnson & Kachigian, P.C.

(57) ABSTRACT

A retractable limb guard assembly for a tractor with a pair of opposed loader brackets and a hydraulic system. The assembly includes a pair of opposed removable brackets connected to the pair of loader brackets. One pair of rocker arms is pivotally connected to each one of the pair of removable brackets. A limb shield is pivotally connected to each of the two pairs of the rocker arms. The pair of hydraulic cylinders is actuated by the tractor hydraulic system wherein each of the hydraulic cylinders extends between one of the removable brackets and one of the rocker arms in order to move the limb shield between a retracted position to an angled protection position.

14 Claims, 3 Drawing Sheets

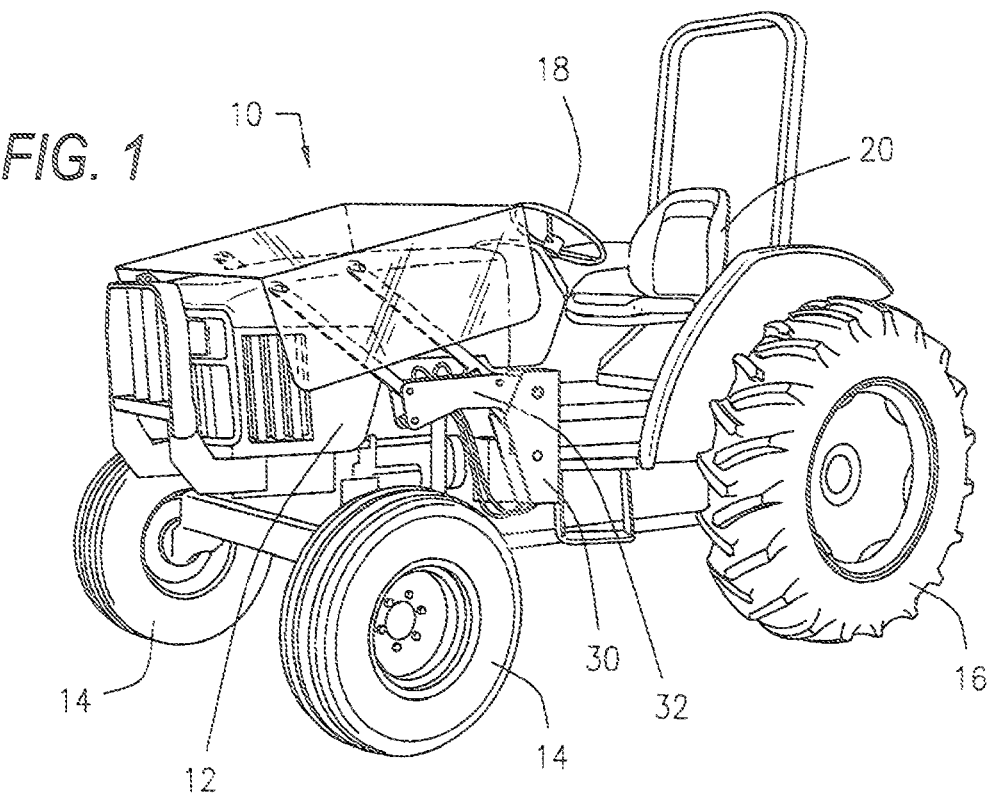
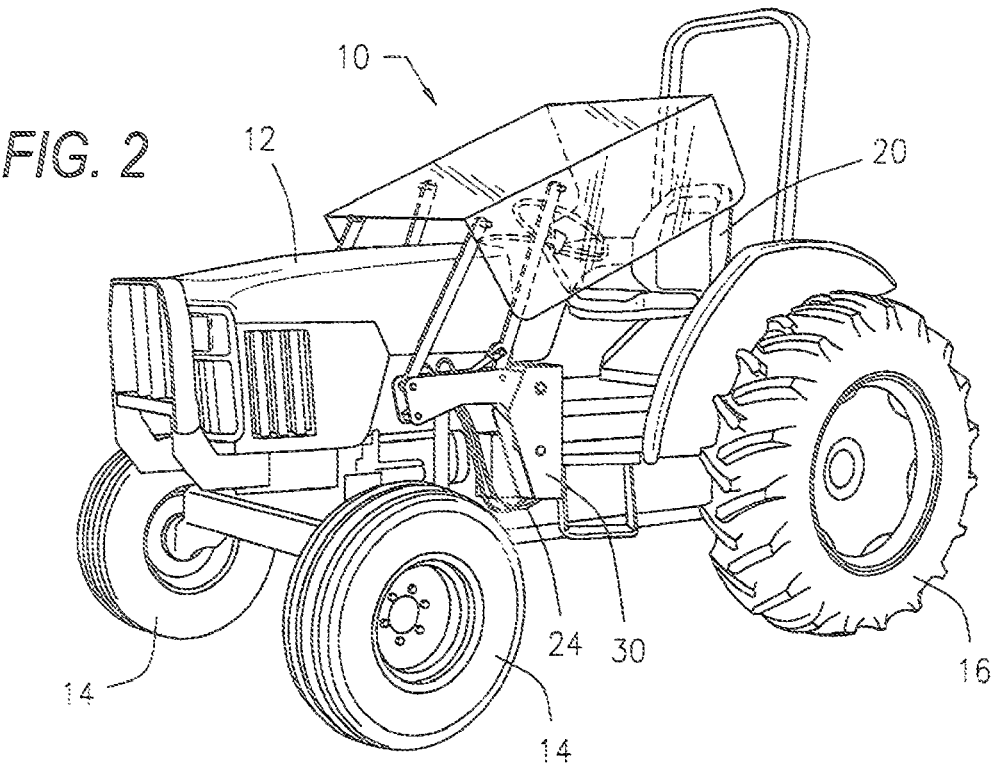

RETRACTABLE LIMB GUARD

BACKGROUND OF THE INVENTION

1. Field of the Invention

The present invention relates to a retractable limb guard assembly for a tractor that may be simply and easily moved between a retracted, horizontal position to an angled, protection position by an existing hydraulic system of the tractor. The present invention additionally provides a retractable limb guard assembly for a tractor that may be detachably connected and disconnected from existing loader brackets on a variety of tractors.

2. Prior Art

Various types of tractors are known and utilized for mechanizing agricultural tasks. The various tractors generally include two pairs of wheels with a single seat and single steering wheel. Track type tractors are also known. An internal combustion engine is located in front of the driver position with a hydraulic system utilized to operate and/or move implements.

Many tractors come equipped with a detachable loader assembly on the front or include a bracket for attachment of a front end loader. The detachable loader assembly may be removed when not in use. A loader will typically utilize two independent sets of hydraulic circuits for its operation. When the loader is not to be used and is removed from the tractor, these hydraulic circuits may be utilized for other implement functions.

In fruit orchards, such as citrus orchards, it is necessary to periodically use a tractor beneath and around the trees. In other orchards, such as pecan orchards, a tractor will be used to harvest the nuts from the ground beneath the trees. Over the years, various devices have been utilized for tractor work in fruit and other orchards with low hanging tree branches. These include fixed cages or sheet metal plates which protect the tractor and operator and deflect low branches. Hedquist et al. (U.S. Pat. No. 2,451,553) shows one example. The Hedquist device may not be removed during operation of the tractor. Also, the fixed nature only permits the operator from mounting and dismantling the tractor from the rear. Due to safety considerations, current tractors can only be mounted from the side.

Enclosed tractor cabs have also been provided for the operator, however, the cab adds additional height and the glass windshield is subject to breaking.

Examples of other prior art designs include Reaves (U.S. Pat. No. 3,180,441) which discloses a guard attachment for a tractor including fender sections 7 and 8 and a u-shaped cowl structure 8.

Dodge (U.S. Pat. No. 2,919,156) discloses a collapsible cab device having components pivoted and foldable into one another in order to be nested. The cab components 26, 28 and 30 are pivotally connected to a pair of adjustment arms 22 and 24. The cab components are pivotally connected to each other so that they can collapse and nest in each other behind the operator's seat 3.

Boucher (U.S. Pat. No. 7,222,882) discloses a tractor with a front end loader 26. A rollover protective assembly is pivotally connected to support a mast 24 and moves between a protective position and a non-protective position.

Notwithstanding the forgoing, there remains a need for a retractable limb guard assembly that may be attached to and detached from standard loader brackets on a variety of tractors.

There also remains a need for a retractable limb guard assembly for a tractor that can be moved from a retracted, substantially horizontal position to an angled protection position to protect the operator.

There also remains a need for a retractable limb guard assembly for a tractor which may be extended and retracted by an operator during operation of the tractor by an existing hydraulic system of a tractor.

SUMMARY OF THE INVENTION

The present invention provides a limb guard assembly which is detachably mounted on a tractor. The limb guard assembly is movable from a retracted, substantially horizontal position to an angled, extended protection position for protection of the operator. A pair of opposed loader brackets are disposed on opposite sides of the internal combustion engine. A pair of removable brackets are detachably connected to the loader brackets.

A first pair of rocker arms, a front rocker arm and a rear rocker arm, are pivotally connected at one end to one of the removable brackets. A second pair of rocker arms, a front rocker arm and a rear rocker arm, are pivotally connected at one end to the other removable bracket. The other, opposed ends of the first pair of rocker arms are pivotally connected to a limb shield. Likewise, the other ends of the second pair of rocker arms are pivotally connected to the limb shield.

Accordingly, the limb shield is movable from a lowered, substantially horizontal, retracted position and an angled, extended position which protects the operator of the tractor while assuring visibility.

A pair of hydraulic cylinders moves the limb shield between the retracted position and the raised position. The pair of hydraulic cylinders are connected to the tractor hydraulic system are actuated and controlled by the operator of the tractor.

BRIEF DESCRIPTION OF THE DRAWINGS

FIG. 1 illustrates a perspective view of a limb guard assembly mounted on a tractor with the limb guard assembly in a retracted position;

FIG. 2 illustrates a perspective view of the limb guard assembly shown in FIG. 1 in an angled, protection position;

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 3:
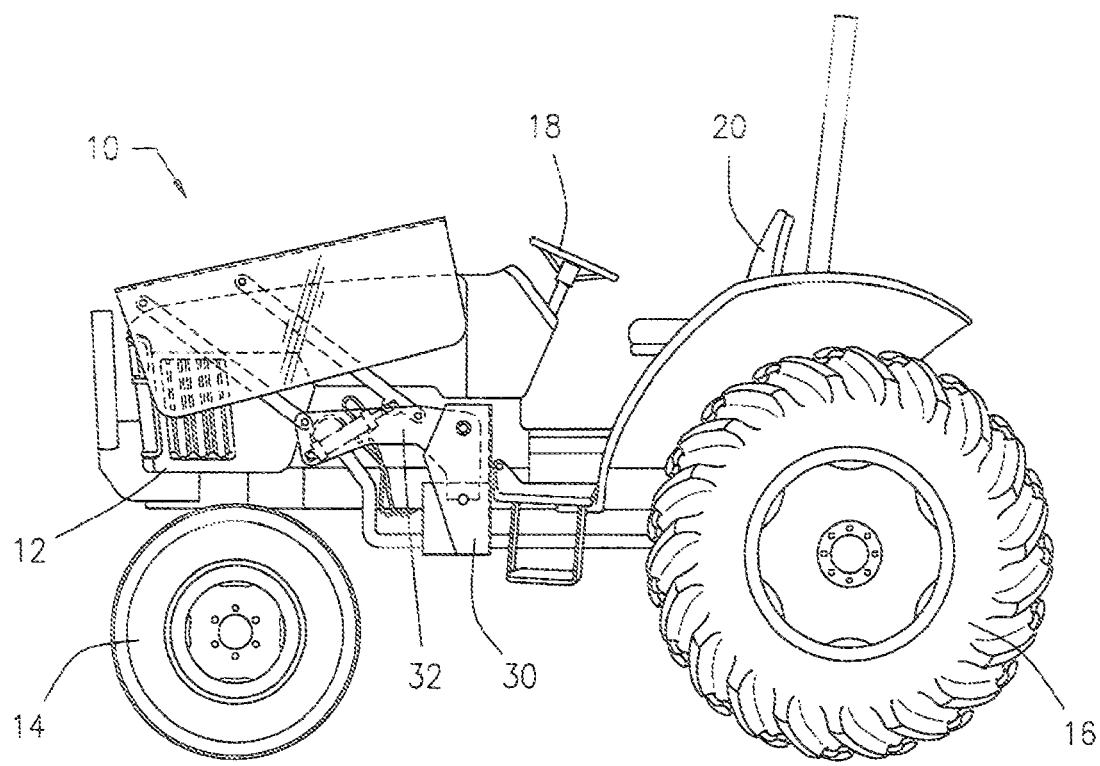
FIG. 3 illustrates a side view of the limb guard assembly as shown in FIG. 1.

Referring to the drawings in detail, FIG. 1 illustrates a perspective view of a limb guard assembly 10 mounted on a tractor 12 with the limb guard assembly in a retracted, substantially horizontal position. FIG. 2 illustrates a perspective view of the limb guard assembly 10 shown mounted on the tractor 12 with the limb guard assembly 10 in an angled, extended, protection position. FIG. 3 illustrates a side view of the limb guard assembly 10 on the tractor 12 as shown in FIG. 1. When the limb guard assembly is in the protection position, the operator is protected from low hanging branches.

The limb guard assembly 10 of the present invention may be utilized and employed with a wide variety of different tractor types and designs. As shown in FIGS. 1, 2 and 3, the tractor 12 generally includes a pair of front wheels 14 and a pair of rear wheels 16. The tractor 12 includes a steering wheel 18 and a seat for the operator 20. An internal combustion engine is located in front of the driver position. A hydraulic system includes various hoses 24 which are connected to controls (not shown) at the driver position for operation of the hydraulic system.

A pair of opposed loader brackets 30 and 31 (one bracket visible in FIGS. 1, 2 and 3) are disposed on opposite sides of the internal combustion engine. The loader brackets 30 and 31 come standard on many different types of tractors 12. The present invention includes a pair of removable brackets 32 and 33, with removable bracket 32 detachably connected loader bracket 30 and removable bracket 33 connected to loader bracket 31.

One of the removable brackets 32 and one of the loader brackets 30 is visible in FIGS. 1, 2 and 3.

Figure 4:
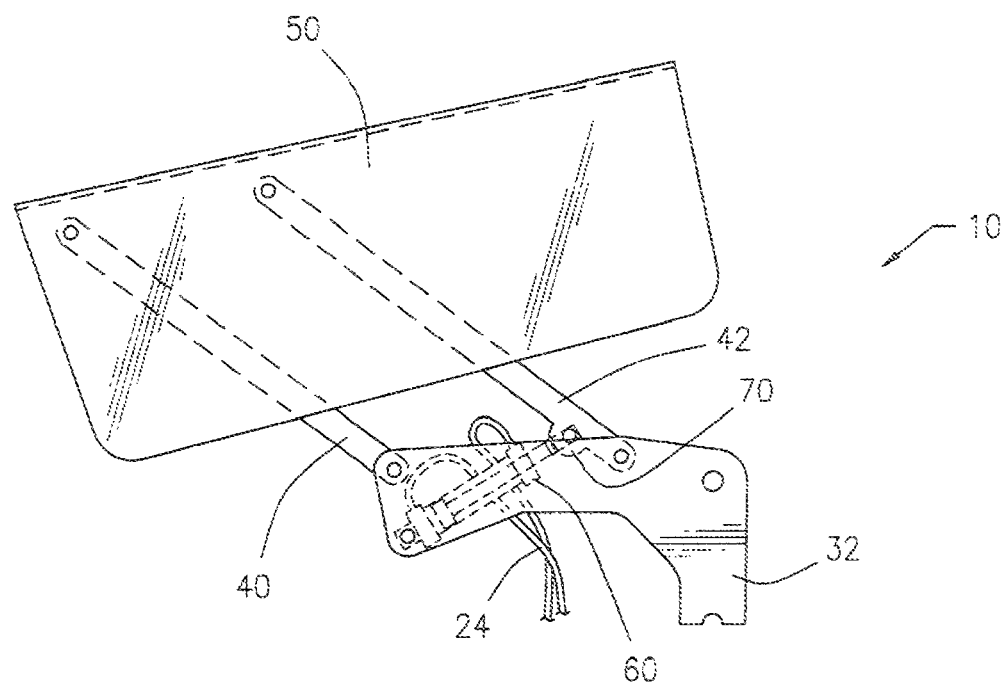
FIG. 4 illustrates a side view of the limb guard assembly apart from the tractor and the loader brackets.

FIG. 4 illustrates a side view of the limb guard assembly 10 apart from the tractor 12 and the loader brackets 30 and 31.

A first pair of rocker arms, front rocker arm 40 and rear rocker arm 42, are pivotally connected at one end to the removable bracket 32. A second pair of rocker arms, front rocker arm 44 and rear rocker arm 46, are pivotally connected at one end to the removable bracket 33.

Figure 6:
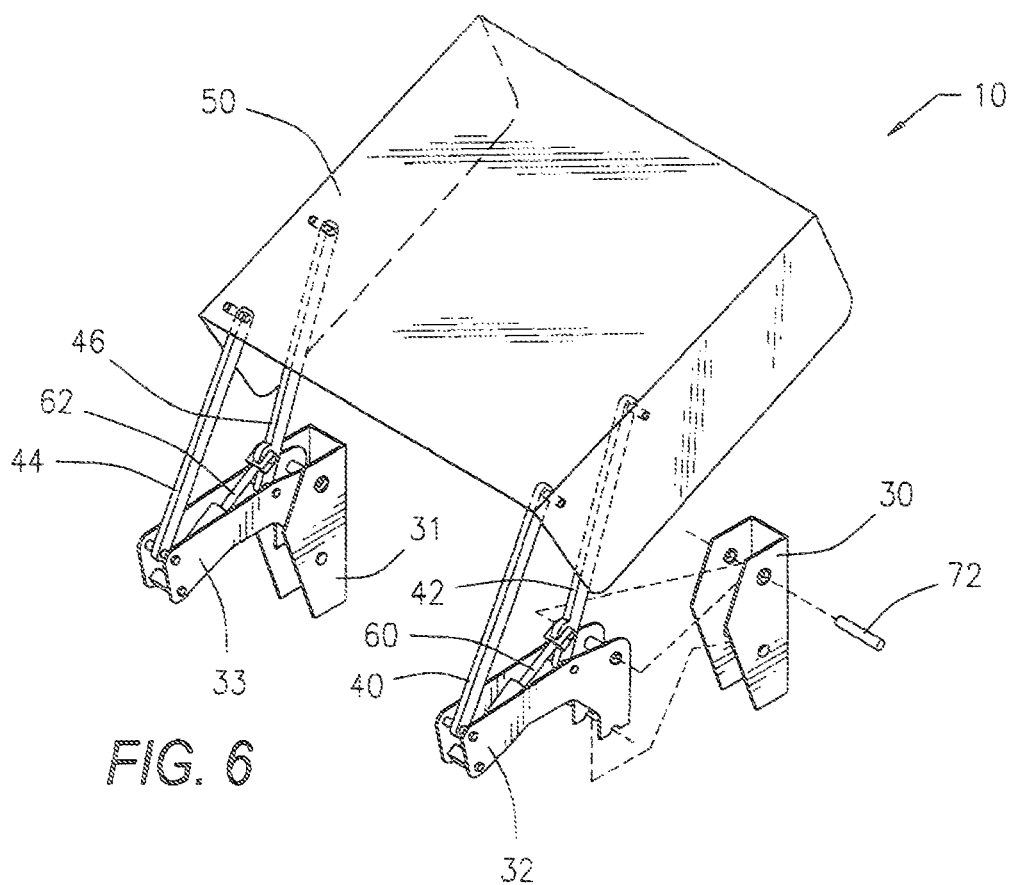
FIG. 6 illustrates the limb guard assembly in an extended, raised angled protection position.

The other ends of the first pair of rocker arms 40 and 42 are pivotally connected to a limb shield 50. Likewise, the second pair of rocker arms 44 and 46 are pivotally connected at opposed ends to the limb shield 50. Accordingly, the limb shield 50 is movable between a lowered, substantially horizontal, retracted position shown in FIGS. 1 and 3 and an angled, extended protection position shown in FIG. 2. In FIG. 6, the loader bracket 30 is exploded from the assembly 10 for clarity. A removable pin 72 retains each loader bracket to the removable bracket. Each removable bracket also includes a notch that is received over a post or posts.

The limb shield 50 itself may have a flat center section and downwardly extending sides. The limb shield 50 may be fabricated from translucent material or a metal mesh. In either case, the operator retains visibility.

Figure 5:
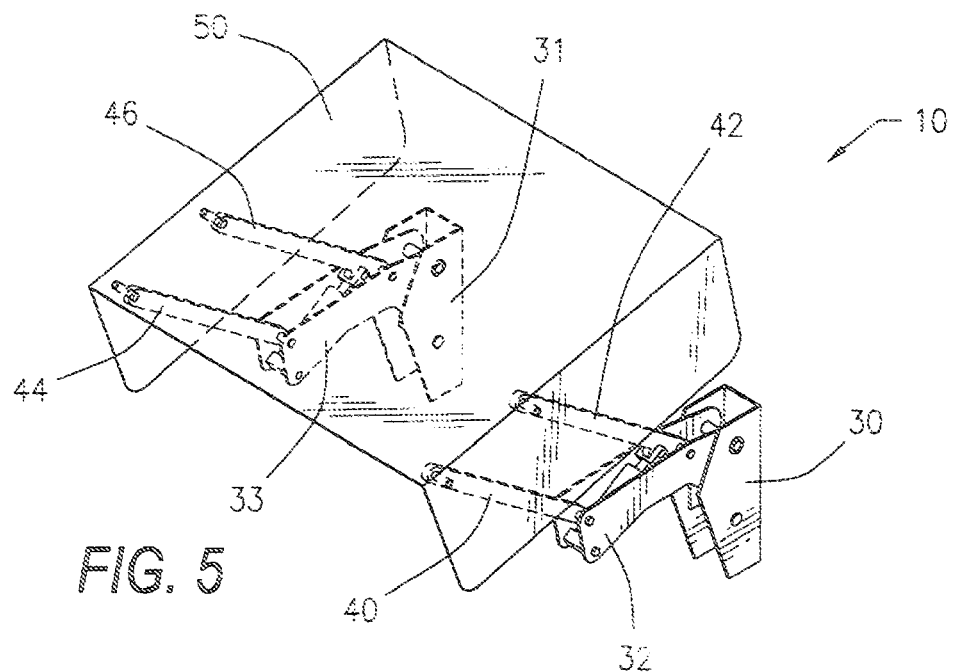
FIG. 5 illustrates a perspective view of the limb guard assembly in a lowered, retracted position.

FIG. 5 illustrates a perspective view of the limb guard assembly 10 in the lowered retracted position while FIG. 6 illustrates the limb guard assembly 10 in the extended, raised, angled protection position. When in the angled protection position, the limb shield is between 20 to 30 degrees from the horizontal position of the tractor.

A pair of hydraulic cylinders 60 and 62 moves the limb shield 50 between the retracted position and the raised position. Hydraulic cylinder 60 extends between and is pivotally connected to the removable bracket 32 and pivotally connected to an ear 70 of the rocker arm 42. The hydraulic cylinder 62 is pivotally connected at one end to the removable bracket 33 and pivotally connected to an ear 70 at the opposed end to the rocker arm 46. The rear rocker arms 42 and 46 are slightly longer than the front rocker arms 40 and 44. Extension of the hydraulic cylinders 60 and 62 moves the limb guard shield to the extended position. Retraction of the hydraulic cylinders returns the limb guard shield to the retracted position.

The invention will be utilized during operation of the tractor. In order to employ the present invention, the pair of hydraulic cylinders 60 and 62 are actuated and controlled by the operator from the operator's position. When the pair of hydraulic cylinders 60 and 62 extends, the rear rocker arms 42 and 46 pivot about the removable brackets 32 and 33. Accordingly, the rocker arms 44 and 46 rotate radially. At the same time, the rocker arms 40 and 44 rotate radially. This causes the limb shield 50 to move from the substantially horizontal position to the extended protection position.

FIG. 6 illustrates the detachable connection of the removable brackets 32 and 33 from the loader brackets 30 and 31.

Whereas, the present invention has been described in relation to the drawings attached hereto, it should be understood that other and further modifications, apart from those shown or suggested wherein, may be made within the spirit and scope of this invention.

What is claimed is:

1. A retractable limb guard assembly for a tractor having a pair of opposed loader brackets and a hydraulic system, wherein said assembly comprises:
a pair of opposed removable brackets, one of said two opposed removable brackets connected to one of said pair of opposed loader brackets;
two opposed pairs of rocker arms, one pair of said two opposed pairs of rocker arms pivotally connected to one of said pair of said removable brackets;
a limb shield pivotally connected to each pair of said two opposed pairs of rocker arms;
a pair of opposed hydraulic cylinders actuated by said tractor hydraulic system wherein each of said pair of hydraulic cylinders extends between one of said pair of said removable brackets and one of said rocker arms in order to move said limb shield between a retracted position to an angled protection position.

2. A retractable limb guard assembly as set forth in claim 1, wherein said pair of opposed removable brackets are connected to said pair of loader brackets by removable pins.

3. A retractable limb guard assembly as set forth in claim 1 wherein said limb shield includes a flat center section and downwardly extending sides.

4. A retractable limb guard assembly as set forth in claim 1, wherein said limb shield is fabricated from metal mesh.

5. A retractable limb guard assembly as set forth in claim 1 wherein said limb shield is fabricated from translucent material.

6. A retractable limb guard assembly as set forth in claim 1, wherein each pair of said two opposed pairs of rocker arms includes a front rocker arm and a rear rocker arm.

7. A retractable limb guard assembly as set forth in claim 6 wherein each of said rear rocker arms is longer than each of said front rocker arms.

8. A retractable limb guard assembly as set forth in claim 1 wherein said retracted, position is substantially parallel to said tractor.

9. A retractable limb guard assembly as set forth in claim 1 wherein said angled protection position is between 20 to 30 degrees from said tractor.

10. A retractable limb guard assembly as set forth in claim 1 wherein each of said hydraulic cylinders is removably pinned at one end to an ear of one of said rocker arms and is removably pinned at an opposed end to one of said removable brackets.

11. A method of retracting and extending a limb guard assembly on a tractor having a pair of opposed loader brackets and a hydraulic system, wherein said method comprises:
- pivoting two opposed pairs of rocker arms wherein each pair of said two opposed pairs of rocker arms is pivotally connected to one of a pair of opposed removable brackets;
- actuating a pair of hydraulic cylinders, wherein one of said pair of hydraulic cylinders extends between one of said pair of removable brackets and one rocker arm of said pairs of opposed rocker arms; and
- moving a limb shield which is pivotally connected to said two opposed pairs of rocker arms between a retracted position and an angled protection position.

12. A method of retracting and extending a limb guard assembly as set forth in claim 11 wherein said pair of opposed removable brackets are detachably connected to said pair of opposed loader brackets.

13. A method of retracting and extending a limb guard assembly as set forth in claim 11 wherein said pair of opposed removable brackets are connected to said pair of opposed loader brackets by removable pins.

14. A method of retracting and extending a limb guard assembly as set forth in claim 11 wherein said pair of hydraulic cylinders are connected to and controlled by the hydraulic system of said tractor.

\* \* \* \* \*